United States Patent
Lian (10) Patent No.: US 10,776,323 B2
(45) Date of Patent: Sep. 15, 2020

(54) DATA STORAGE FOR MOBILE TERMINALS

(71) Applicant: Alibaba Group Holding Limited, George Town (KY)

(72) Inventor: Jie Lian, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 220 days.

(21) Appl. No.: 15/903,995

(22) Filed: Feb. 23, 2018

(65) Prior Publication Data
US 2018/0181563 A1 Jun. 28, 2018

Related U.S. Application Data

(63) Continuation of application No. PCT/CN2016/095520, filed on Aug. 16, 2016.

(30) Foreign Application Priority Data

Aug. 24, 2015 (CN) .......................... 2015 1 0524667

(51) Int. Cl.
*G06F 16/178* (2019.01)
*G06F 16/41* (2019.01)
(Continued)

(52) U.S. Cl.
CPC .......... *G06F 16/1794* (2019.01); *G06F 16/00* (2019.01); *G06F 16/116* (2019.01);
(Continued)

(58) Field of Classification Search
CPC ............. G06F 2221/033; G06F 16/258; G06F 2009/4557; G06F 21/53; G06F 8/63;
(Continued)

(56) References Cited

U.S. PATENT DOCUMENTS 6,529,909 B1 * 3/2003 Bowman-Amuah ....................... G06F 16/258
8,996,535 B1 * 3/2015 Kimmel ................ G06F 3/0608 707/747

(Continued)

FOREIGN PATENT DOCUMENTS

CN 102298641 12/2011
CN 102999522 3/2013

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Angelica Ruiz
(74) *Attorney, Agent, or Firm* — Fish & Richardson P.C.

(57) ABSTRACT

The present disclosure describes techniques for converting and storing data in a unified format. One example method includes converting original data to a first data having a predetermined format; generating first metadata and a key value corresponding to the first data during the conversion of the original data; determining whether second metadata corresponding to the key value exists in a cache; determining whether the second metadata are different from the first metadata; in response to determining that the second metadata does not exist in the cache or to determining that the second metadata are different from the first metadata, storing the first data, the first metadata, and the key value to the cache; determining that a predetermined condition is satisfied; and in response determining that the predetermined condition is satisfied, storing the first data, the first metadata, and the key value to a non-relational database.

18 Claims, 6 Drawing Sheets

(51) Int. Cl.
  *G06F 16/11* (2019.01)
  *G06F 16/22* (2019.01)
  *G06F 16/907* (2019.01)
  *G06F 16/00* (2019.01)
(52) U.S. Cl.
  CPC .......... *G06F 16/2272* (2019.01); *G06F 16/41* (2019.01); *G06F 16/907* (2019.01)
(58) Field of Classification Search
  CPC ........ G06F 8/71; G06F 16/00; G06F 11/3495; G06F 11/3684; G06F 16/2455; G06F 16/86; G06F 2009/45562
  USPC ........... 707/600–831, 899, 999.001–999.206
  See application file for complete search history.

(56) References Cited

U.S. PATENT DOCUMENTS

| | | |
|---|---|---|
| 2003/0208559 A1 | 11/2003 | Velline et al. |
| 2009/0254971 A1* | 10/2009 | Herz ...................... G06Q 10/10 726/1 |
| 2013/0097664 A1* | 4/2013 | Herz ...................... G06Q 10/10 726/1 |
| 2013/0179423 A1 | 7/2013 | Gur et al. |
| 2014/0040286 A1 | 2/2014 | Bane et al. |
| 2015/0095308 A1* | 4/2015 | Kornacker ............ G06F 16/258 707/718 |
| 2015/0249852 A1* | 9/2015 | Tang .................. H04N 21/4753 725/28 |
| 2015/0350186 A1* | 12/2015 | Chan ................... H04L 63/0807 726/9 |
| 2016/0162550 A1* | 6/2016 | Wang ................ G06F 16/24568 707/602 |

FOREIGN PATENT DOCUMENTS

| | | |
|---|---|---|
| CN | 103034650 | 4/2013 |
| CN | 103853714 | 6/2014 |
| CN | 104462127 | 3/2015 |
| CN | 104504158 | 4/2015 |
| CN | 104778193 | 7/2015 |
| JP | 2005352711 | 12/2005 |
| JP | 2011008451 | 1/2011 |
| JP | 2012508932 | 4/2012 |
| JP | 2013037517 | 2/2013 |
| JP | 2013536515 | 9/2013 |
| WO | WO 2010114006 | 10/2010 |
| WO | WO 2014171413 | 10/2014 |

OTHER PUBLICATIONS

Nakamoto, "Bitcoin: A Peer-to-Peer Electronic Cash System," www.bitcoin.org, 2005, 9 pages.

Extended European Search Report issued in EP Application No. 16838499.8 dated May 25, 2018; 7 pages.

International Search Report of the International Searching Authority issued in International Application No. PCT/CN2016/095520 dated Nov. 18, 2016; 9 pages.

PCT International Preliminary Report on Patentability in International Application No. PCT/CN2016/095520, dated Feb. 27, 2018, 9 pages (with English translation).

* cited by examiner

DATA STORAGE FOR MOBILE TERMINALS

This application is a continuation of PCT Application No. PCT/CN2016/095520, filed on Aug. 16, 2016, which claims priority to Chinese Patent Application No. 201510524667.6, filed on Aug. 24, 2015, and each application is incorporated by reference in its entirety.

TECHNICAL FIELD

This disclosure relates to storage technologies and, more particularly, to data storage method and apparatus for mobile terminals.

BACKGROUND

With the development of science and technology, an increasing number of mobile terminals have entered people's life, such as smart phones and tablets. A user can install a variety of applications on a mobile terminal. Accordingly, an increasing amount of data needs to be stored locally on the mobile terminal. The data can have different formats and frequently changing structures, which can seriously affect read and write performance of the mobile terminal and can reduce the efficiency of development, operation, and maintenance of the applications.

SUMMARY

The present disclosure describes methods and systems, including computer-implemented methods, computer program products, and computer systems for converting and storing data in a unified format.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes converting and storing data in a unified format, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Example implementations are described herein in detail, and illustrated in corresponding drawings. In the following description including the corresponding drawings, the same numerals in different drawings represent the same or similar elements, unless otherwise specified. Implementations described in the following example implementations do not represent all implementations of the present disclosure. Instead, they are merely examples of apparatuses and methods consistent to some aspects of the present disclosure, such as those detailed in the appended claims.

Terms used in the present disclosure are merely for describing specific implementations, instead of limiting the present disclosure. Singular forms "a(n)", "said", and "the" used in the present disclosure and the appended claims can also include plural forms, unless clearly specified in the context that other meanings are intended. It should be further understood that the term "and/or" used herein refers to and includes any or all possible combinations of one or more associated items listed.

It should be understood that although terms such as "first", "second", and "third" can be used in the present disclosure to describe different types of information, the information should not be limited to the terms. These terms are merely used to distinguish different types of information from each other. For example, without departing from the scope of the present disclosure, the first information can also be referred to as second information, and similarly, the second information can also be referred to as first information. Depending on the context, the word "if" used herein can be explained as "when . . . ", "as . . . ", or "in response to the determination".

Figure 1:
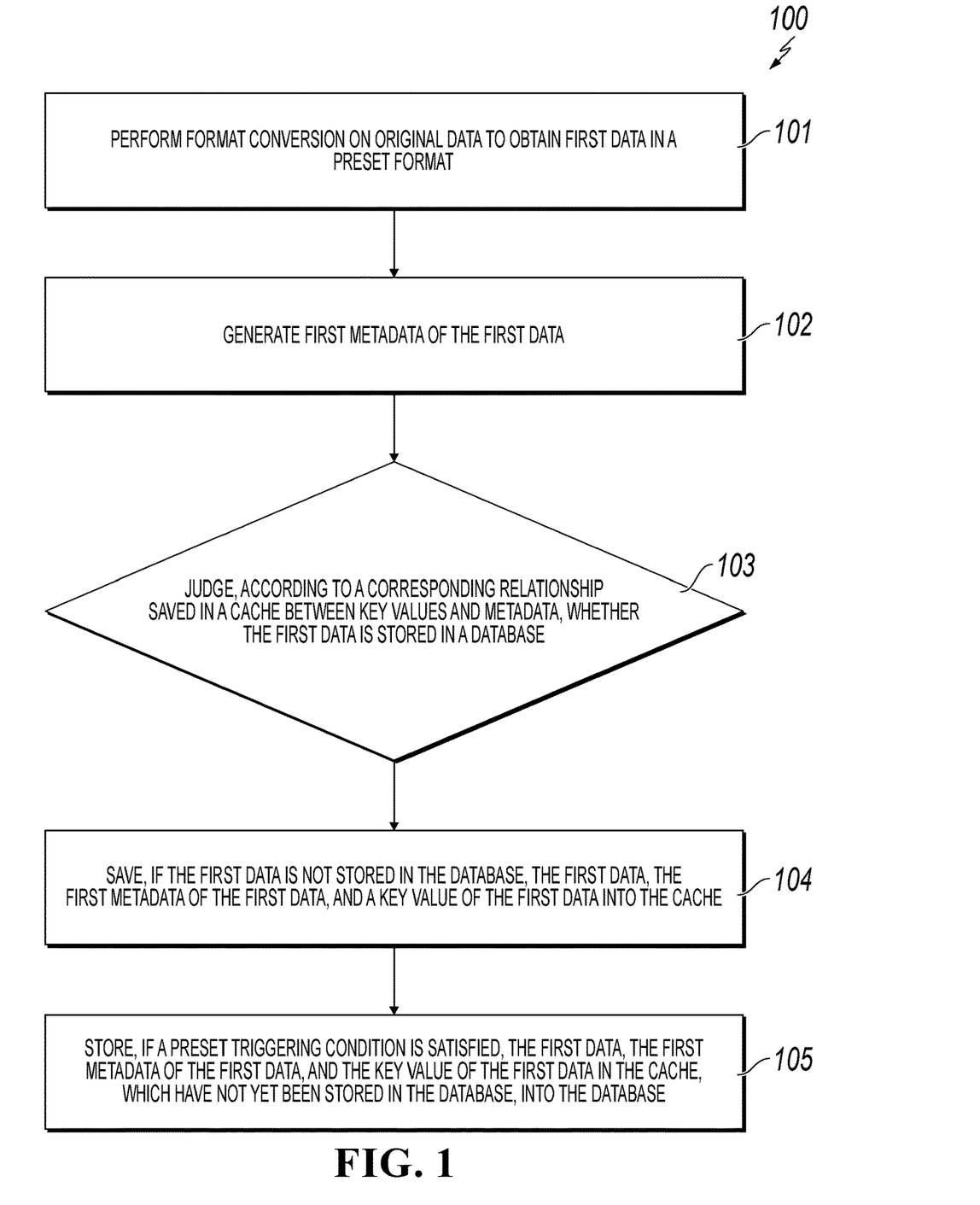
FIG. 1 is a flowchart illustrating an example data storage method of a mobile terminal, according to an implementation of the present disclosure.

FIG. 1 is a flowchart illustrating an example data storage method of a mobile terminal, according to an implementation of the present disclosure.

Referring to FIG. 1, the data storage method can be applied to a mobile terminal. The mobile terminal can be a smart phone, a tablet, a Personal Digital Assistant (PDA), and other smart devices. The data storage method can include the following steps:

At step 101, format conversion is performed on original data to obtain first data in a predetermined format. The original data can include data to be stored in a local database of a mobile terminal. The original data can include news, lists, information, and other data used by various applications and cached locally. The original data can be in text format, XML format, etc.

Upon receipt of the original data to be stored, the mobile terminal can perform format conversion on the original data to convert the data to a predetermined format. The predetermined format can be in a format such as a binary format or a decimal format determined by an administrator. In the present disclosure, for ease of description, data obtained after format conversion of the original data can be referred to as first data.

At step 102, first metadata of the first data are generated. Based on the foregoing step 101, after converting the original data into the first data, the mobile terminal can generate metadata of the first data. In the present disclosure, the generated metadata of the first data are referred to as first metadata.

At step 103, whether the first data are stored in a database is determined based on a corresponding relationship saved in a cache between key values and metadata. If the first data are not stored in the database, step 104 is performed. In order to improve the read-write efficiency, a non-relational database that stores data based on a Key-Value can be used as an underlying storage medium of the mobile terminal. The non-relational database can include first data, first metadata, and Key values generated from format converting of each piece of the original data. A corresponding relationship between each piece of the first metadata and a key value in the non-relational database is saved in a cache of the mobile terminal. For ease of differentiation, the first metadata saved in the cache is referred to as second metadata. Specifically, the mobile terminal can save after restart, a corresponding relationship between each piece of first metadata and a key value in the non-relational database (hereinafter "database") in a cache, such as memory. After receiving the original data to be stored in the database, the mobile terminal can also save first metadata corresponding to the original data and a key value in the cache if it is determined that the format converted original data are not stored in the database, that is, the first data from the original data are not stored in the database. The implementations of the process are detailed in the following descriptions.

In this step, the mobile terminal can determine whether the first data have been stored in the database. The key value of the first data is also the key value of the original data.

Figure 2:
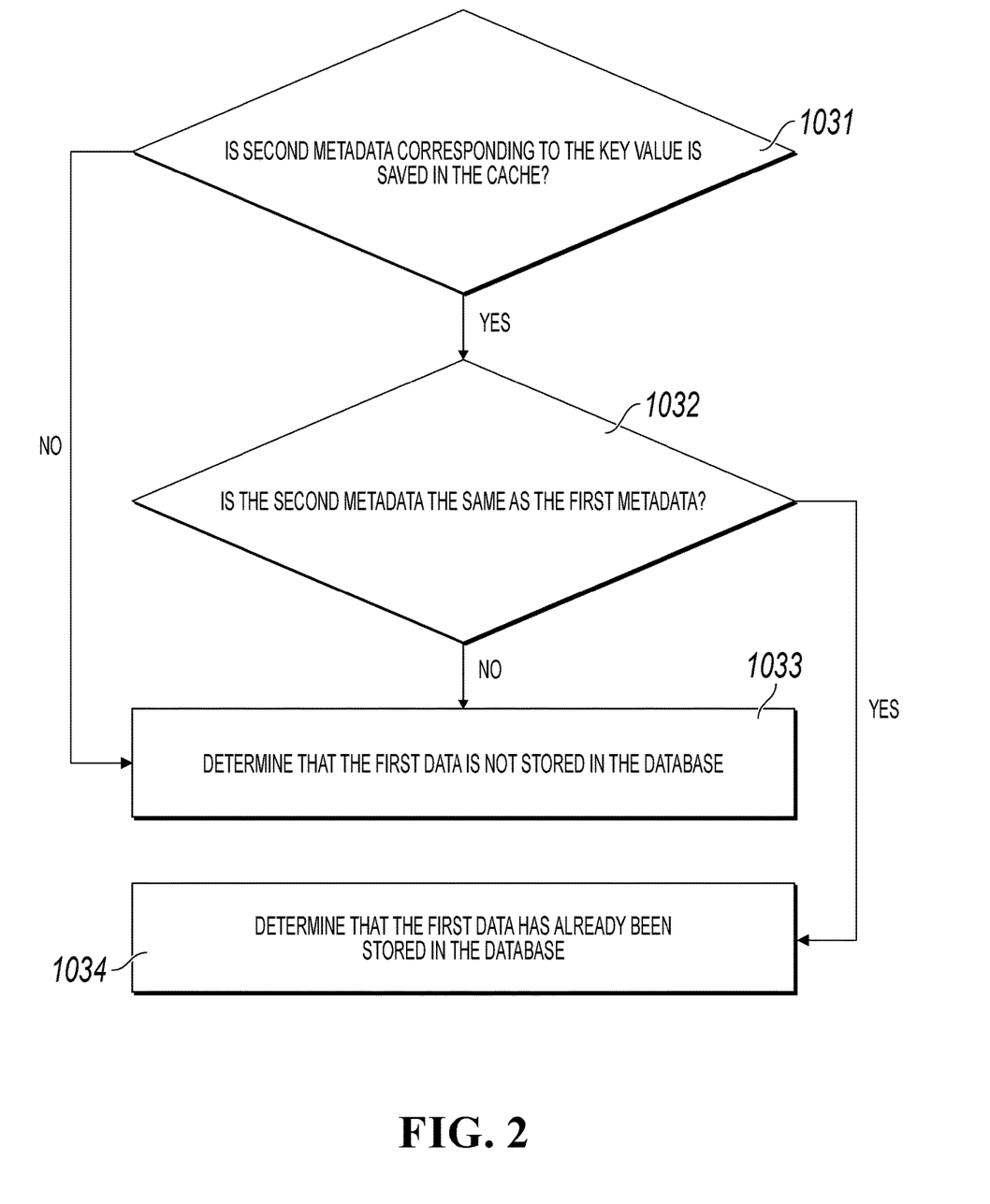
FIG. 2 is a schematic flowchart illustrating a step of determining whether first data are stored in a database, according to an example implementation of the present disclosure.

Referring to FIG. 2, the step of determining whether the first data are stored in a database can include the following steps:

Step 1031. Whether second metadata corresponding to the key value is saved in the cache is determined based on the key value of the first data. If the second metadata corresponding to the key value is saved in the cache, step 1032 is performed. Or, if the second metadata corresponding to the key value is not saved in the cache, step 1033 is performed.

Step 1032. Whether the second metadata are the same as the first metadata are determined. If the second metadata are different from the first metadata, step 1033 is performed, or, if the second metadata are the same as the first metadata, step 1034 is performed.

Based on the result of the determination in step 1031, if the second metadata corresponding to the key value is saved in the cache, it can indicate that first data corresponding to the key value is stored in the database. However, it is unknown whether the first data are first data of the latest version. Therefore, whether the second metadata are the same as the generated first metadata can be determined in this step.

Whether the second metadata are the same as the first metadata can be determined by comparing each byte of the second metadata with the first metadata. Whether the second metadata are the same as the first metadata can also be determined by determining whether a hash value of the second metadata are the same as a corresponding hash value of the first metadata. For example, the second metadata can include a hash value stored in the database and corresponds to the first data. In this step, a hash value of the first data can be calculated according to the first data obtained after conversion in step 101, so as to use the hash value as the hash value of the first metadata. Whether the hash value obtained by calculation is the same as the hash value included in the second metadata is then determined. If they are different, it is determined that the second metadata are different from the first metadata, and step 1033 is performed. If they are the same, it is determined that the second metadata are the same as the first metadata, and step 1034 is performed.

Step 1033. It is determined that the first data are not stored in the database. Based on the determination result of step 1031, if the second metadata corresponding to the key value is not saved in the cache, it can be determined that the first data are not stored in the database.

Based on the determination result of step 1032, if the second metadata are different from the first metadata, it indicates that the first data having a same key value is stored in the database, but the first data are different from the first data obtained by conversion in step 101. As a result, the two pieces of first data have different metadata. This can be a result of the first data stored in the database not being the latest data and needing an update. In such case, it can also be determined that the first data obtained by conversion in step 101 is not stored in the database.

Step 1034. It is determined that the first data are stored in the database. Based on the determination result of step 1032, if the second metadata are the same as the first metadata, it indicates that first data with a same key value is stored in the database, and the first data are the same as the first data obtained by conversion in step 101. In such case, an update is not required. The mobile terminal can delete the original data received in step 101, the first data obtained after conversion, and the first metadata generated in step 102. Whether the received original data has been stored in the database can be determined based on a corresponding relationship saved in the cache between key values and metadata, which greatly reduces system resource consumption caused by database access.

Step 104. The first data, the first metadata of the first data, and the key value of the first data are saved into the cache. Based on the determination result of step 103, the first data needs to be stored in the database if it is not. In this implementation, the first data, the first metadata of the first data, and the key value of the first data are first saved into the cache.

In situations where the first data are not stored in the database in step 103, the following two implementation methods can be employed in this step:

In some implementations, the second metadata corresponding to the key value of the first data are not saved in the cache. In this case, it indicates that first data of the original data received in step 101 is not stored in the database, and then the mobile terminal can first save the first data, the first metadata of the first data, and the key value of the first data into the cache and mark them as not stored. The mobile terminal can set a flag bit for marking a storage state for the combination of the first data, the first metadata of the first data, and the key value of the first data. For example, if the flag bit is 0, it indicates that these data are not stored. If the flag bit is 1, it indicates that the data have been stored. The mobile terminal can also set a list of key values, and store the key value of the first data not stored in the database to the list of key values. Certainly, those skilled in the art can also mark, in another manner, whether the data saved in the cache has already been stored in the database, which is not specially limited in the present disclosure.

In some implementations, the second metadata corresponding to the key value of the first data are saved in the cache, but the second metadata are different from the first metadata of the first data. In such case, the first data having a same key value are stored in the database, but the first data are not the latest first data, hence need to be updated. The mobile terminal can update the second metadata corresponding to the key value of the first data which are saved in the cache to the first metadata, and save the first data, such that latest metadata are saved in the cache for each key value. In addition, similar to the first method, the updated data can also be marked as not stored.

Step 105. If a predetermined triggering condition is satisfied, the first data, the first metadata of the first data, and the key value of the first data in the cache, that have not been stored in the database, are stored in the database. If a predetermined triggering condition is satisfied, the mobile terminal can store to the database the first data, the first metadata of the first data, and the key value of the first data in the cache that have not yet been stored to the database. That is, store the data that are marked as not stored in the cache to the database. The triggering condition can be set by the administrator. For example, the triggering condition can be that a predetermined time period has been reached, or that the amount of cached data reaches a predetermined threshold. But the triggering condition is not limited to the above in the present disclosure.

It can be seen from the above description that the present disclosure provides converting original data to data in a predetermined format and then storing the data to a Key-Value-based non-relational database, hence eliminating the structural difference of the data, improving data compatibility and the efficiency of data reading and writing.

In another implementation of the present disclosure, the mobile terminal can also store first data having a relatively high read frequency into the cache to improve the read efficiency. Therefore, when receiving a data read instruction, the mobile terminal can first search the cache according to a key value included in a read command to determine whether corresponding first data are saved there. When the corresponding first data are saved in the cache, reverse format conversion can be performed to the first data in the cache, and then a reading result can be returned after the first data are converted into original data. When the first data corresponding to the key value is not saved in the cache, the mobile terminal can first search for metadata (second metadata) saved in the cache that correspond to the key value, then obtain first data that correspond to the key value from the database based on the metadata, then perform reverse format conversion on the obtained first data, and return a reading result after the first data are converted into original data.

In another implementation of the present disclosure, when a predetermined condition is satisfied, the mobile terminal can delete the first data saved in the cache. For example, the mobile terminal can regularly delete the first data saved in the cache, and can also delete the first data saved in the cache when a read frequency of the first data are less than a threshold. The present disclosure is not specially limited to this example.

In addition, based on related technologies, the data storage solution provided in the present disclosure can further support encrypted storage. For example, after converting original data into first data in a predetermined format, the mobile terminal can encrypt the first data and then store the first data. Correspondingly, after reading the first data, the mobile terminal decrypts the first data, converts the first data into the original data and then returns a reading result.

Corresponding to the previous implementations of the data storing method of a mobile terminal, the present disclosure further provides an implementation of a data storage apparatus for the mobile terminal.

Figure 3:
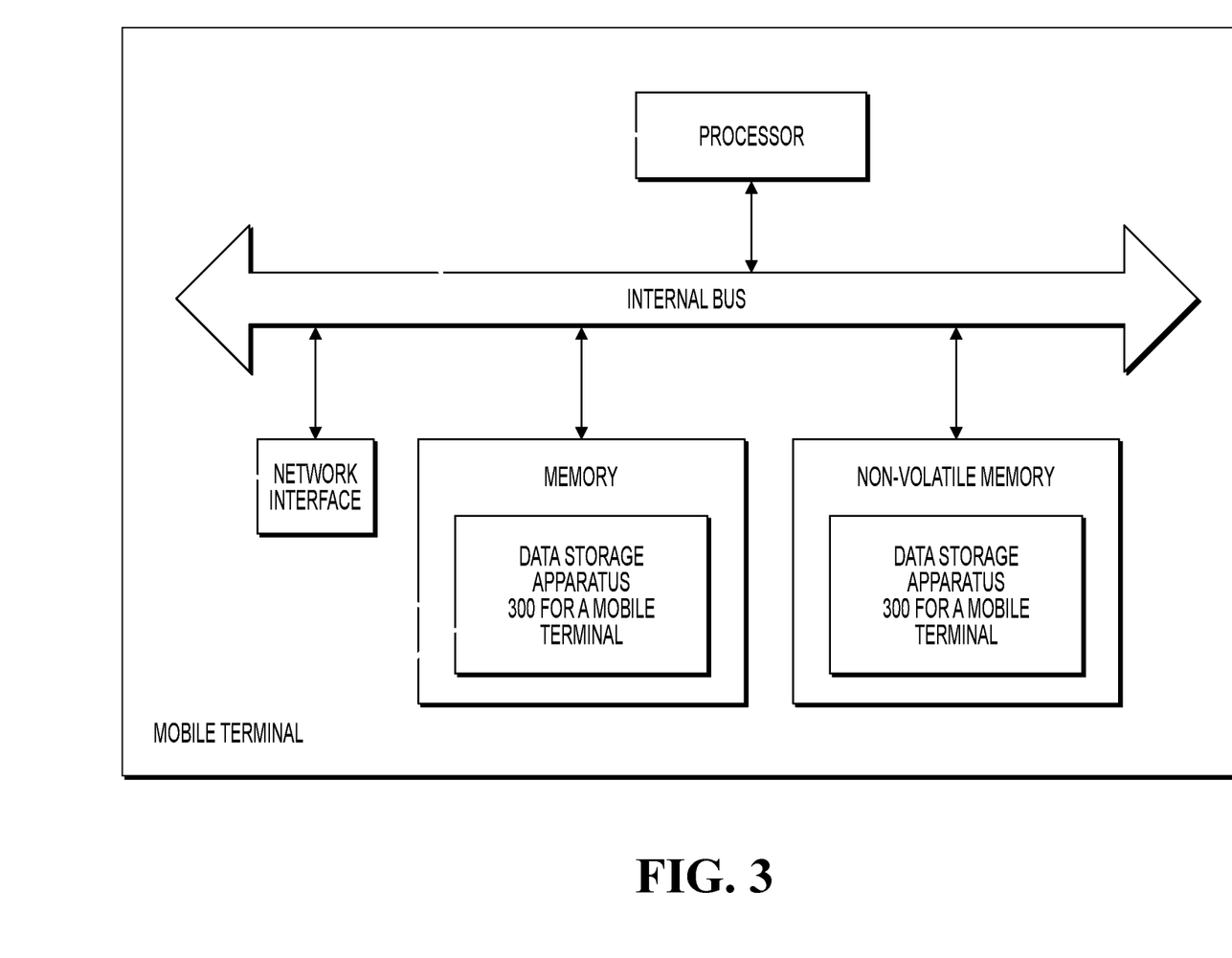
FIG. 3 is a schematic structural diagram of a mobile terminal, according to an example implementation of the present disclosure.

The implementation of the data storage apparatus in the present disclosure can be used in a mobile terminal. The apparatus implementation can be implemented by software, hardware, or a combination of software and hardware. Using a software implementation as an example, the apparatus can be a logical apparatus formed by running computer program instruction stored in memory reading from a non-volatile memory. From a hardware perspective, as shown in FIG. 3, which is a hardware structural diagram of a mobile terminal where the data storage apparatus is located, according to an example implementation of the present disclosure. In addition to a processor, memory, a network interface, and a non-volatile memory shown in FIG. 3, the mobile terminal where the apparatus is located in the implementation can further include other hardware based on actual functions of the mobile terminal, which are not described further in here.

Figure 4:
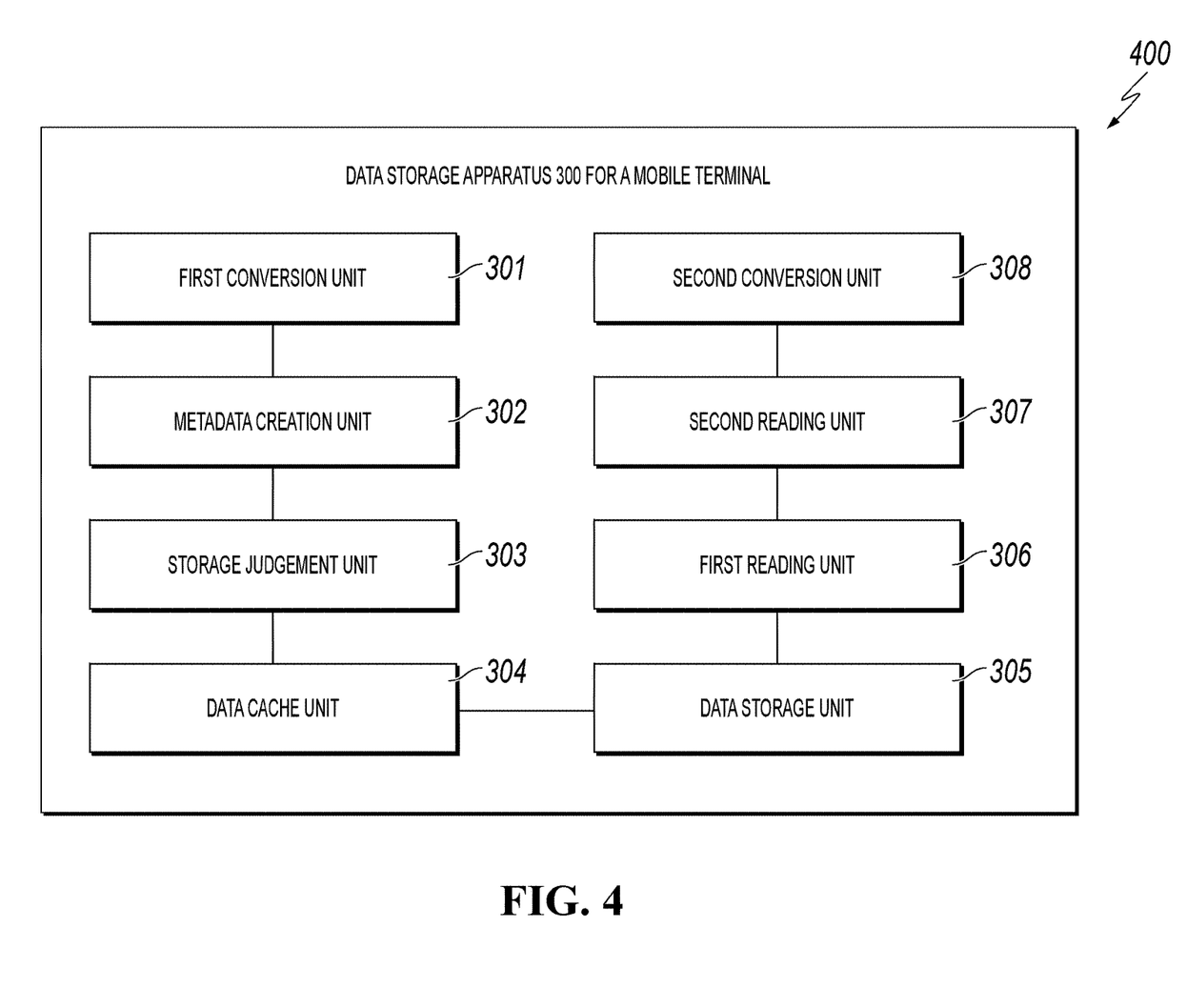
FIG. 4 is a schematic structural diagram of a data storage apparatus for a mobile terminal, according to an example implementation of the present disclosure.

FIG. 4 is a schematic structural diagram of a data storage apparatus for a mobile terminal, according to an example implementation of the present disclosure.

Referring to FIG. 4, the data storage apparatus 300 for a mobile terminal can include: a first conversion unit 301, a metadata generation unit 302, a storage determination unit 303, a data cache unit 304, a data storage unit 305, a first reading unit 306, a second reading unit 307, and a second conversion unit 308.

The first conversion unit 301 is configured to perform format conversion on original data to obtain first data in a predetermined format.

The metadata generation unit 302 is configured to generate first metadata of the first data.

The storage determination unit 303 is configured to determine, according to a corresponding relationship saved in a cache between key values and metadata, whether the first data are stored in a database.

The data cache unit 304 is configured to save, if the first data are not stored in the database, the first data, the first metadata of the first data, and a key value of the first data into the cache.

The data storage unit 305 is configured to store, if a predetermined triggering condition is satisfied, the first data, the first metadata of the first data, and the key value of the first data in the cache, which have not yet been stored in the database, into the database.

Optionally, the storage determination unit 303 can be specifically configured to determine, based on the key value of the first data, whether second metadata corresponding to the key value is saved in the cache, and that the first data are not stored in the database if the second metadata corresponding to the key value is not saved in the cache.

Optionally, the storage determination unit 303 can be specifically configured to determine, whether the second metadata are the same as the first metadata when the second metadata corresponding to the key value is saved in the cache, and determine that the first data are not stored in the database if the second metadata are different from the first metadata.

The data cache unit 304 is specifically configured to update the second metadata saved in the cache that correspond to the key value of the first data to the first metadata, and store the first data.

Optionally, the storage determination unit 303 is specifically configured to determine whether a hash value of the second metadata is the same as a hash value of the first metadata. If yes, it is determined that the second metadata are the same as the first metadata. If no, it is determined that the second metadata are different from the first metadata.

Optionally, the predetermined triggering condition includes: reaching a predetermined time period and the amount of cached data reaching a predetermined threshold.

The first reading unit 306 is configured to search, during data reading, the cache based on the key value to determine whether the corresponding first data are saved in the cache.

The second reading unit 307 is configured to obtain, when the first data corresponding to the key value is not saved in the cache, the first data corresponding to the key value from the database according to the metadata saved in the cache that correspond to the key value.

The second conversion unit 308 is configured to convert the first data into the original data and return a reading result.

For the implementation processes of functions and effects of various units in the apparatus, reference can be made to the implementation processes of the corresponding steps in the method, and details thereof are not repeated herein.

Figure 5:
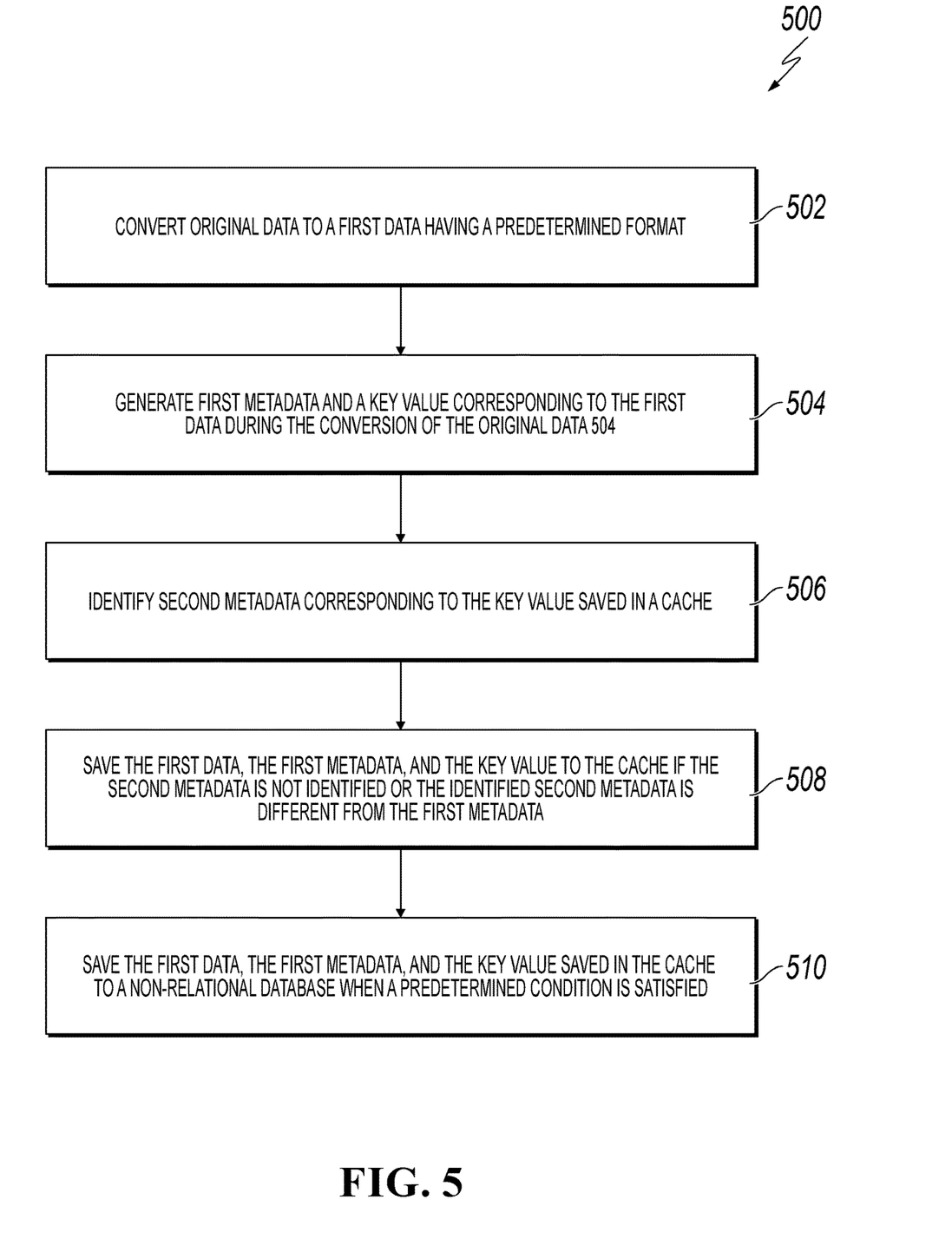
FIG. 5 is a flowchart illustrating an example of a method for converting and storing data in a unified format, according to an implementation of the present disclosure.
Figure 6:
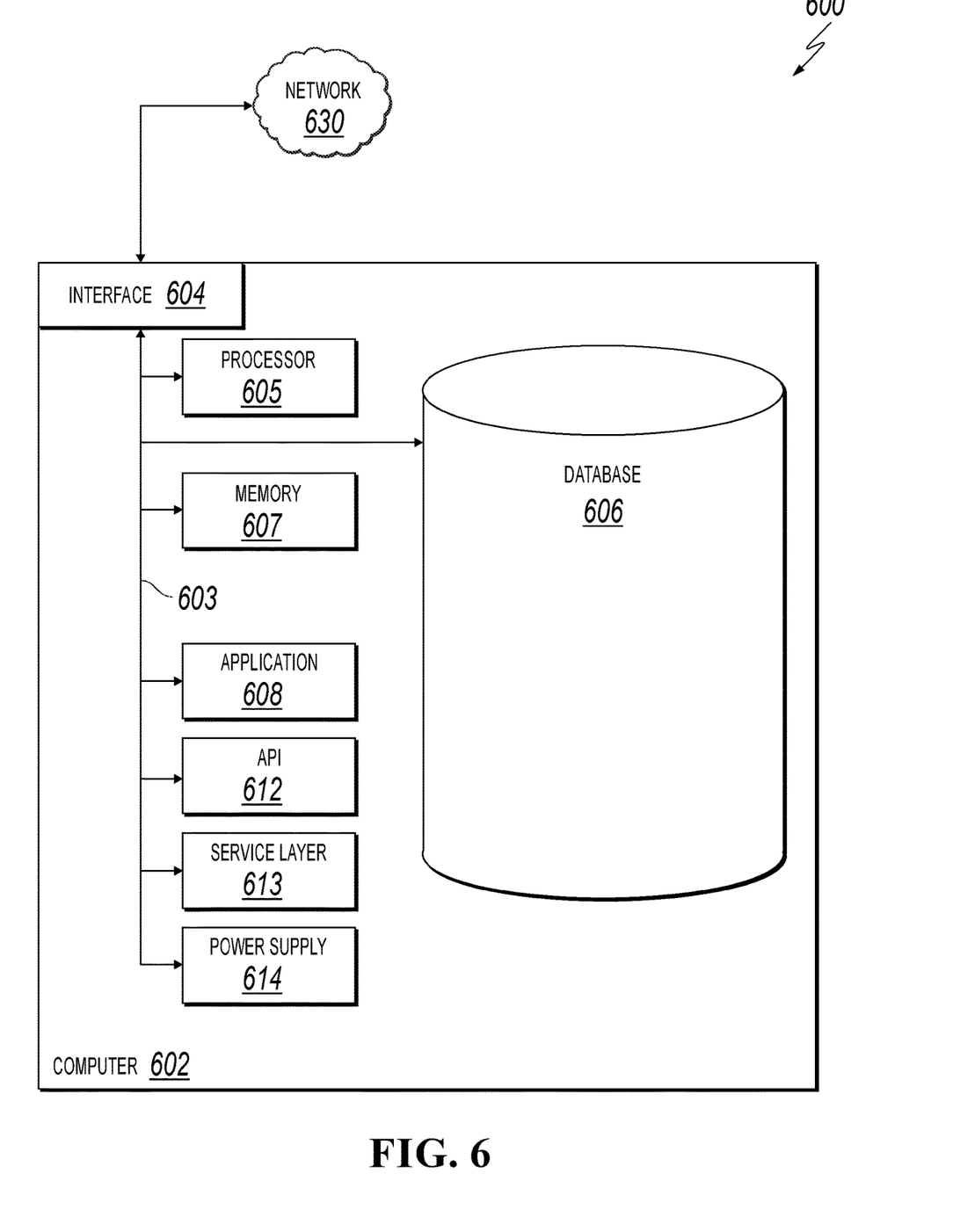
FIG. 6 is a block diagram illustrating an example of a computer-implemented system used to provide computational functionalities associated with described algorithms, methods, functions, processes, flows, and procedures, according to an implementation of the present disclosure.

FIG. 5 is a flowchart illustrating an example of a method 500 for converting and storing data in a unified format, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, original data are converted to a first data having a predetermined format. The original data can be any data stored locally or remotely in any format in a database or memory of a computing device. In some cases, a mobile terminal can convert the original data to a predetermined format. The predetermined format can be used as a unified format of data stored in the database, such that data management, processing, and maintenance can be more efficiently performed, and read/write performance can be improved. The predetermined format can be any format set by an administrator. For example, the predetermined format can be a binary format or a decimal format. Data converted from the original data can be referred to as first data. From 502, method 500 proceeds to 504.

At 504, first metadata and a key value corresponding to the first data are generated during the conversion of the original data. In some cases, the database used to store the first data can be a non-relational database that the data are stored based on Key-Value pairs. In such cases, when converting the original data to the first data, a corresponding key value and first metadata are also generated. From 504, method 500 proceeds to 506.

At 506, second metadata corresponding to the key value saved in a cache are identified. Identifying the second metadata can be based on the key value. If data corresponding to the same key value is saved in the cache, then the data are the second metadata that can be identified. Otherwise, the second metadata cannot be identified. From 506, method 500 proceeds to 508.

At 508, the first data, the first metadata, and the key value are saved to the cache if the second metadata are not identified or the identified second metadata are different from the first metadata. In some cases, second data corresponding to the key value generated during the conversion of the original data can be identified. The second data are then compared to the first data converted from the original data. If the second data are different from the first data, the first data are saved to the cache, together with the first metadata and the key value, to replace the second data. In other words, the second data corresponding to the same key value is updated by the latest first data. In other cases, second data corresponding to the key value generated during the conversion of the original data cannot be identified. In other words, no data corresponding to the generated key value is saved in the cache. In such cases, the first data, together with the first metadata and the key value are saved to the cache. From 508, method 500 proceeds to 510.

At 510, the first data, the first metadata, and the key value saved in the cache are saved to a non-relational database when a predetermined condition is satisfied. The predetermined condition can be a predetermined period of time, the amount of cached data reaches a predetermined size, or other conditions that warrant data transfer from cache to non-relational database. After 510, method 500 stops.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on non-transitory computer storage media for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple Compact Discs (CDs), Digital Video Discs (DVDs), magnetic disks, or other storage devices).

The operations described in this specification can be implemented as operations performed by a data processing apparatus on data stored on one or more computer-readable storage devices or received from other sources.

The terms "data processing apparatus," "computer," or "computing device" encompass all kinds of apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application specific integrated circuit (ASIC). The apparatus can also include, in addition to hardware, code that creates an execution environment for the computer program in question, for example, code that constitutes processor firmware, a protocol stack, a database management system, an operating system (for example, LINUX, UNIX, WINDOWS, MAC OS, ANDROID, IOS, another operating system, or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, software module, software unit, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile device, a personal digital assistant (PDA), a game console, a Global Positioning System (GPS) receiver, or a portable storage device (for example, a universal serial bus (USB) flash drive), to name just a few. Devices suitable for storing computer program instructions and data include all forms of non volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM and DVD-ROM disks. The processor and the memory can be supplemented by, or incorporated in, special purpose logic circuitry.

Mobile devices can include mobile telephones (for example, smartphones), tablets, wearable devices (for example, smart watches, smart eyeglasses, smart fabric, smart jewelry), implanted devices within the human body (for example, biosensors, smart pacemakers, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors.

To provide for interaction with a user, embodiments of the subject matter described in this specification can be implemented on a computer having a display device, for example, a cathode ray tube (CRT) or liquid crystal display (LCD) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented using computing devices interconnected by any form or medium of wireline or wireless digital data communication (or combination thereof), for example, a communication network. Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Worldwide Interoperability for Microwave Access (WIMAX), Long Term Evolution (LTE), Code Division Multiple Access (CDMA), 5G protocols, IEEE 802.11 a/b/g/n or 802.20 protocols (or a combination of 802.11x and 802.20 or other protocols consistent with the present disclosure), Internet Protocol (IP), Frame Relay, Asynchronous Transfer Mode (ATM), ETHERNET, or other protocols or combinations of protocols. The communication network can transmit voice, video, data, or other information between the connected computing devices.

Embodiments of the subject matter described in this specification can be implemented using clients and servers interconnected by a communication network. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   converting original data to a first data having a predetermined format;
   generating first metadata and a key value corresponding to the first data during the conversion of the original data, wherein the first metadata comprises a hash value computed for the original data;
   determining whether second metadata corresponding to the key value exists in a cache based on a predetermined relationship stored in the cache between key values and metadata;
   in response to determining that the second metadata corresponding to the key value exists in the cache, determining whether the second metadata is different from the first metadata;
   in response to determining that the second metadata does not exist in the cache or to determining that the second metadata are different from the first metadata, storing the first data, the first metadata, and the key value to the cache;
   determining that a predetermined condition is satisfied; and
   in response to determining that the predetermined condition is satisfied, storing the first data, the first metadata, and the key value to a non-relational database.

2. The computer-implemented method of claim 1, wherein the identified second metadata are different from the first metadata when a hash value of the second metadata are different from a hash value of the first metadata.

3. The computer-implemented method of claim 1, wherein the predetermined condition is a predetermined period of time and the predetermined condition is satisfied when the predetermined period of time lapses from a time the first data, the first metadata, and the key value are stored in the cache.

4. The computer-implemented method of claim 1, wherein the predetermined condition is a predetermined amount of data and the predetermined condition is satisfied when a size of the first data, the first metadata, and the key value stored in the cache reach the predetermined amount.

5. The computer-implemented method of claim 1, further comprising:
   receiving a data reading request associated with the first data;
   identifying the first data from the cache based on the key value corresponding to the first data; and
   converting the identified first data to the original data and returning the first data as a reading result in response to the data reading request.

6. The computer-implemented method of claim 1, wherein the first data are encrypted before storing to the cache or the non-relational database.

7. A non-transitory, computer-readable medium storing one or more instructions executable by a computer system to perform operations comprising:
   converting original data to a first data having a predetermined format;
   generating first metadata and a key value corresponding to the first data during the conversion of the original data, wherein the first metadata comprises a hash value computed for the original data;
   determining whether second metadata corresponding to the key value exists in a cache based on a predetermined relationship stored in the cache between key values and metadata;
   in response to determining that the second metadata corresponding to the key value exists in the cache, determining whether the second metadata is different from the first metadata;

in response to determining that the second metadata does not exist in the cache or to determining that the second metadata are different from the first metadata, storing the first data, the first metadata, and the key value to the cache;

determining that a predetermined condition is satisfied; and in response to determining that the predetermined condition is satisfied, storing the first data, the first metadata, and the key value to a non-relational database.

8. The non-transitory, computer-readable medium of claim 7, wherein the identified second metadata are different from the first metadata when a hash value of the second metadata are different from a hash value of the first metadata.

9. The non-transitory, computer-readable medium of claim 7, wherein the predetermined condition is a predetermined period of time and the predetermined condition is satisfied when the predetermined period of time lapses from a time the first data, the first metadata, and the key value are stored in the cache.

10. The non-transitory, computer-readable medium of claim 7, wherein the predetermined condition is a predetermined amount of data and the predetermined condition is satisfied when a size of the first data, the first metadata, and the key value stored in the cache reach the predetermined amount.

11. The non-transitory, computer-readable medium of claim 7, the operations further comprising:

receiving a data reading request associated with the first data;

identifying the first data from the cache based on the key value corresponding to the first data; and converting the identified first data to the original data and returning the first data as a reading result in response to the data reading request.

12. The non-transitory, computer-readable medium of claim 7, wherein the first data are encrypted before storing to the cache or the non-relational database.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

converting original data to a first data having a predetermined format;

generating first metadata and a key value corresponding to the first data during the conversion of the original data, wherein the first metadata comprises a hash value computed for the original data;

determining whether second metadata corresponding to the key value exists in a cache based on a predetermined relationship stored in the cache between key values and metadata;

in response to determining that the second metadata corresponding to the key value exists in the cache, determining whether the second metadata is different from the first metadata;

in response to determining that the second metadata does not exist in the cache or to determining that the second metadata are different from the first metadata, storing the first data, the first metadata, and the key value to the cache;

determining that a predetermined condition is satisfied; and in response determining that the predetermined condition is satisfied, storing the first data, the first metadata, and the key value to a non-relational database.

14. The computer-implemented system of claim 13, wherein the identified second metadata are different from the first metadata when a hash value of the second metadata are different from a hash value of the first metadata.

15. The computer-implemented system of claim 13, wherein the predetermined condition is a predetermined period of time and the predetermined condition is satisfied when the predetermined period of time lapses from a time the first data, the first metadata, and the key value are stored in the cache.

16. The computer-implemented system of claim 13, wherein the predetermined condition is a predetermined amount of data and the predetermined condition is satisfied when a size of the first data, the first metadata, and the key value stored in the cache reach the predetermined amount.

17. The computer-implemented system of claim 13, the operations further comprising:

receiving a data reading request associated with the first data;

identifying the first data from the cache based on the key value corresponding to the first data; and converting the identified first data to the original data and returning the first data as a reading result in response to the data reading request.

18. The computer-implemented system of claim 13, wherein the first data are encrypted before storing to the cache or the non-relational database.

* * * * *